April 2, 1935.  F. W. THOMAS  1,996,219
AUXILIARY AIR METER FOR THE INTAKE MANIFOLD
OF AN INTERNAL COMBUSTION ENGINE
Filed Feb. 6, 1933
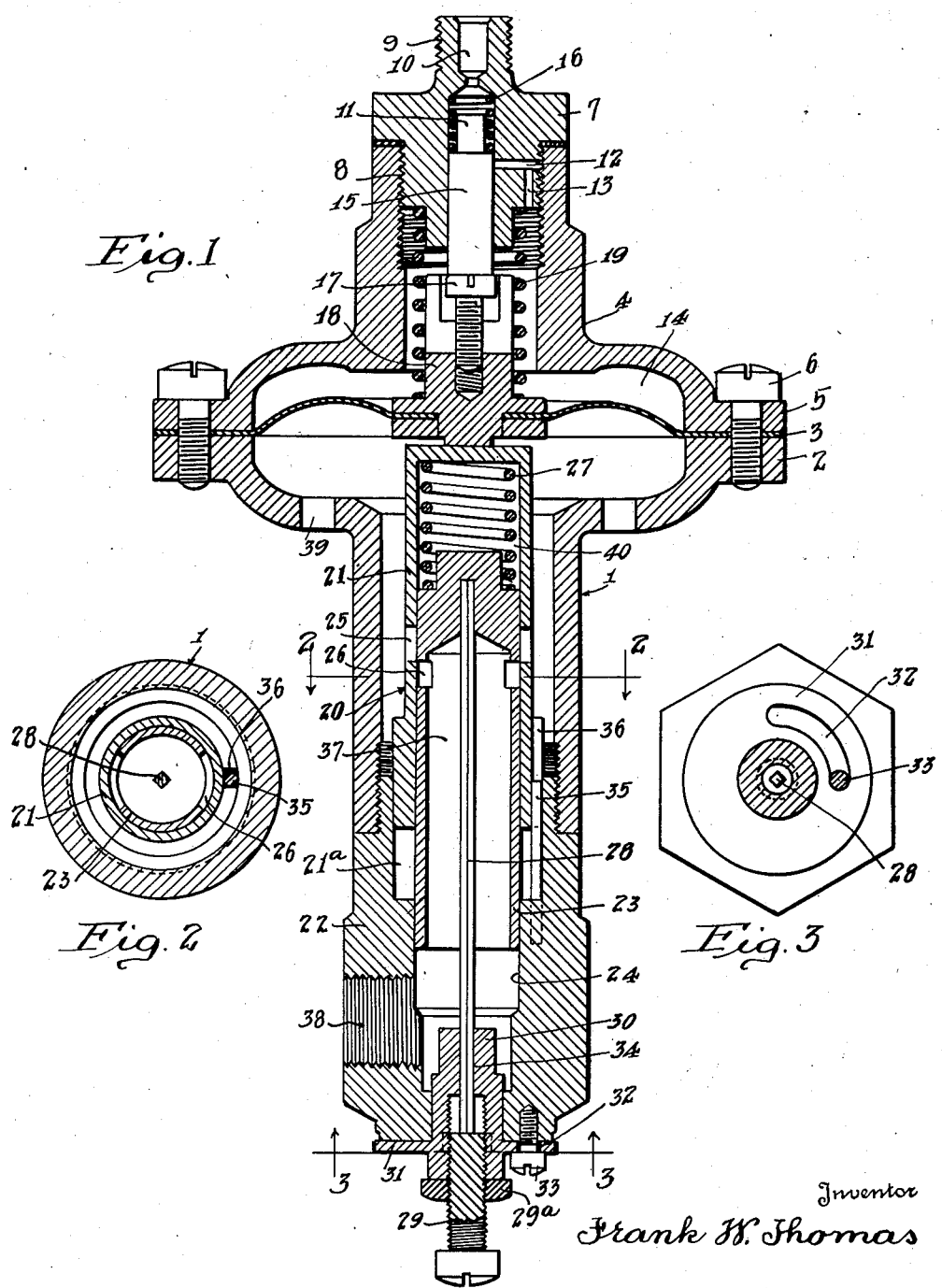

Patented Apr. 2, 1935

1,996,219

UNITED STATES PATENT OFFICE 1,996,219

AUXILIARY AIR METER FOR THE INTAKE MANIFOLD OF AN INTERNAL COMBUSTION ENGINE

Frank W. Thomas, Pasadena, Calif.

Application February 6, 1933, Serial No. 655,468

15 Claims. (Cl. 123—124)

This invention relates to a device for metering auxiliary air into the intake manifold of an internal combustion engine during certain operating conditions thereof, for improving the operating characteristics and efficiency of the engine.

Practically all commercial carburetors, when correctly adjusted, produce a mixture of air and fuel to form a highly combustible or explosive mixture. The proportions of the mixture of air and fuel may vary over a relatively wide range, as for example, a very rich mixture may be composed of nine parts of air by weight to one part of fuel by weight, while a very lean mixture be composed of seventeen parts of air by weight, to one part of fuel by weight. For convenience, the composition of the combustible mixture may be referred to as the air-fuel ratio, and evaluated in the number of units of air by weight to one unit of fuel by weight. Thus, an air-fuel ratio of 16, would mean sixteen parts of air to one of fuel, each by weight.

An air-fuel ratio of substantially 12½ approaches the most powerful mixture for an internal combustion engine, and is therefore most desired when the engine is idling or operating under very heavy loads where the maximum power output of the engine is demanded. Therefore, most of the commercial carburetors are designed to supply the engine for all operating speeds and loads with a combustible mixture having an air-fuel ratio of approximately 12½. However, an air-fuel ratio of 12½ is not the most efficient combustible mixture. The combustible efficiency of the mixture increases substantially in direct proportion until the air-fuel ratio reaches a value of substantially 16; thereafter, the efficiency decreases as the mixture becomes leaner.

It is desirable to supply an internal combustion engine with a combustible mixture having an air-fuel ratio of as near 12½ as possible when operating at idling speed, and also when operating under very heavy load conditions, and for all operating conditions between idling and full power output, an air-fuel ratio of as near 16 as possible. The range of operating conditions of the motor between idling and full power output, may be termed the average or mean operating conditions of the motor. In motor vehicles the engine operates at an average or mean load for a far greater percentage of time than under idling or full power output, and therefore, it is important to provide means which will function automatically to increase the air-fuel ratio from 12½ or thereabouts, to 16 or thereabouts during the mean power output of the engine.

It is an object of this invention to provide such means that will operate automatically to increase the air-fuel ratio for the mean operating loads of the engine, and thereby materially improve the operating characteristics and efficiency of the engine.

A further object is to provide an auxiliary air metering device operative for metering a predetermined quantity of auxiliary air into the intake manifold of an internal combustion engine while the engine is operating under mean load conditions.

A further object is to provide an auxiliary air metering device operative for sealing the auxiliary air supply during the operation of the engine under conditions of heavy load output, or when idling.

A further object is to provide means for adjusting the amount of opening of the metering ports of an auxiliary air metering device.

A further object is to provide an auxiliary air metering device with cushioning or dampening means for controlling the action of the metering valve.

A further object is to provide an auxiliary air metering device which will be operative responsive to the degree of vacuum in the intake manifold of an internal combustion engine for controlling and metering the flow of auxiliary air into the said engine intake manifold.

A further object is to provide an auxiliary air metering device having vacuum operated means communicating with the intake manifold of an internal combustion engine, and for providing a valve means operative for controlling the said communicating means.

A further object is to provide an auxiliary air metering device which is simple in design, rugged in construction, and reliable in operation.

A further object is to locate the entrance of the duct which communicates the manifold with the diaphragm of the vacuum operated auxiliary air metering device in spaced relation with regard to the entrance of the auxiliary air duct into the manifold, so that the admission of auxiliary air may not materially affect the degree of vacuum in the diaphragm duct.

Other objects and advantages of the invention will become apparent as the nature of the same is more fully understood from the following description and accompanying drawing, wherein is set forth what is now considered to be a preferred embodiment. It should be understood, however, that this particular embodiment of the invention is chosen principally for the purpose of exemplification, and that variations therefrom in details of construction or arrangement of parts may accordingly be effected, and yet remain within the spirit and scope of the invention as the same is set forth in the appended claims.

In the drawing:

Figure 1 illustrates a sectional view of the auxiliary air metering device of this invention, and illustrates the position the parts would assume when a high degree of vacuum is generated in the intake manifold of an internal combustion engine, so as to close the metering ports and thereby shut off the supply of auxiliary air to the manifold.

Figure 2 illustrates a sectional view taken substantially in the plane of line 2—2 of Fig. 1 looking in the direction of the arrows.

Figure 3 illustrates a sectional view taken substantially in the plane of line 3—3 of Fig. 1, looking in the direction of the arrows.

The preferred form of the invention may include a housing or body 1, flanged as at 2 to receive a diaphragm 3. A cap 4 having a flange 5 corresponding to flange 2 between which flanges the diaphragm may be tightly sealed as by means of screws 6. A fitting 7 may be suitably mounted upon the upper end of cap 4 as by means of the screw threads 8, and may be provided with a threaded boss 9 to receive a suitable pipe connection for communicating the bore 10 with intake manifold of an internal combustion engine. The engine, pipe and fitting have not been shown as the same, and the manner of connecting the pipe are so well understood by those skilled in this art. It is important however, that the connection to the engine manifold be made well to the engine side of the usual throttle butterfly valve. The bore 10 communicates with a piston valve bore 11, and by means of passages 12 and 13 with the diaphragm cavity 14 formed between the upper side of diaphragm 3 and cap 4.

A valve means may be provided for controlling the admission or discharge of air to or from the upper side of diaphragm 3, which means may include a piston valve 15 operatively mounted in bore 11, and may be provided with a spring means 16 for resiliently urging the piston valve to uncover passage 12. The lower end of valve 15 may protrude from the end of fitting 7, and may be engaged by the head of the adjusting screw 17, which screw may be screw-threaded into plunger 18 carried by diaphragm 3. When the piston valve 15 closes the end of passage 12, it does not completely seal this passage, but acts to retard the flow of air therepast, or in other words, acts to dampen or retard the action of the diaphragm.

A spring means 19 may act between the diaphragm plunger 18 and fitting 7 to yieldingly urge the diaphragm in the direction of housing 1. From the above description, it may be observed that the diaphragm is actuated responsive to changes in the amount or degree of vacuum in the engine manifold, and it is desirable to utilize the motion of the diaphragm for actuating an auxiliary air valve for metering a predetermined amount of air into the engine intake manifold for increasing the air fuel ratio.

The metering valve 20 may include a ported sleeve 21 arranged to abut against the diaphragm plunger 18 at its upper end, and to be slidably mounted in bore 21ª of the cylinder member 22. A ported valve member 23 may be slidably mounted in sleeve 21, and also in the bore 24 of the cylinder member 22. The sleeve 21 and valve member 23 may be provided with cooperating valve ports 25 and 26. A spring means 27 may act between the sleeve and valve member to yieldingly urge the sleeve into abutting engagement with the diaphragm plunger and the valve member against a square supporting and adjusting rod 28, which rod in turn is supported by the adjusting screw 29, which screw may be threaded into the angular adjusting member 30. The angular adjusting member 30 may be flanged as at 31, and the flanged portion provided with an arcuate adjusting slot 32 and clamped to the cylinder member 22 by means of screw 33. The angular adjusting member 30 may be provided with a square hole 34 through which the square adjusting rod 28 may be slidably mounted.

By means of the adjusting screw 29 the valve member 23 may be raised or lowered, thereby adjusting the point at which ports 25 and 26 will open and close with relation to the actuation of sleeve 21 by the diaphragm, thus adjusting the degree or amount of vacuum necessary for opening and closing the ports. A nut 29ª may be provided on screw 29 for locking the screw in its adjusted position.

By means of the angular adjusting member 30, ports 26 may be rotated to fully register with ports 25, or may be rotated until ports 26 are completely out of register with ports 25. Thus the passage through ports 25 and 26 may be nicely regulated and then locked in the adjusted position by means of screw 33. A key 35 may act in keyway 36 to prevent rotation of sleeve 21.

Ports 26 may communicate with the interior 37 of the valve member 23, which in turn may communicate with the bore 24 of the cylinder 22. A pipe or other suitable means not shown, may be connected to the threaded bore 38 for communicating the metering valve with the intake manifold on the engine side of the throttle butterfly valve.

The operation of the invention may be substantially as follows: With the engine operating at the idling speed, the vacuum in the intake manifold will be maintained at a relatively high degree due to the pumping action of the pistons, and due to the fact that the engine throttle will be closed. The high degree of vacuum will be communicated to the space 14 above the diaphragm as previously pointed out, thus causing the diaphragm to lift to the position illustrated in Figure 1. As the diaphragm rises, sleeve 21 will, due to the action of spring 27, also rise to the position illustrated in Figure 1, whereby the ports 25 will be raised above the ports 26 to close the metering valve formed by these two sets of ports, so as to prevent auxiliary air from entering the engine manifold, thus the air-fuel ratio will remain in the neighborhood of 12 to 13. When the throttle is opened, the vacuum drops, but this drop in vacuum will not be immediately communicated to the space 14 because the piston valve 15 closes the end of passage 12. However, as the piston valve 15 does not completely seal the end of passage 12, the vacuum in space 14 will be gradually dissipated, whereupon the spring 19 will cause the diaphragm to slowly fall, thus causing the sleeve 21 to be moved downwardly, whereby the ports 25 will be moved more or less into register with ports 26. The extent of opening of ports 25 and 26 will depend upon the degree of vacuum in the manifold. As soon as the port 25 moves into register with ports 26, auxiliary air will be drawn into housing 1 through ports 39, and will flow through the metering valve and through the opening to the engine manifold, thereby increasing the air-fuel ratio. By adjusting the angular position of ports 26 with relation to the ports 25, the area of opening of these ports may be adjusted to thereby regulate the amount of auxiliary air which may be drawn into the manifold so that the air-fuel ratio may approach the most efficient ratio of namely, 16. Thus for a wide range of operating conditions, auxiliary air will be admitted into the manifold to increase the efficiency of the air-fuel ratio. Should the engine throttle be opened further in response to a condition requiring heavy power output, the vacuum in the manifold would be practically dissipated, thus permitting the diaphragm 3 to move further in a downwardly direction, and to in turn actuate the sleeve 21 downwardly until the ports 25 are moved out of register with ports 26, and thereby sealing off the supply of auxiliary air, whereupon the air-fuel ratio will return to the more powerful ratio of substantially 12½. When the need for the heavy power output of the engine is overcome, the throttle will be partially closed, thus permitting a vacuum to again build up in the manifold, which in turn will reduce the pressure in space 14, thereby causing the lifting of the diaphragm and sleeve 21, whereupon ports 25 will again register with ports 26 to admit auxiliary air into the engine manifold to increase the efficiency of the air-fuel ratio. But should the throttle be fully closed so that the engine will run at idling speed, the vacuum in the manifold will increase to such a degree that the diaphragm will be caused to return to the position illustrated in Figure 1, and correspondingly, sleeve 21 will rise to move ports 25 out of register with ports 26.

By means of the adjusting screw 29, the position of the valve member 23 may be adjusted so that when the engine is idling, the lower edge of ports 25 may be just slightly above the upper edge of ports 26. In this position, the metering valve formed by ports 25 and 26, seal the manifold against the admission of auxiliary air.

The advantage of the piston valve 15 is that it acts as a dampening means for slightly retarding the action of the diaphragm when the engine throttle is swung open from the idling position, whereby the rich power air-fuel ratio is maintained for a short interval while the engine is responding to the change in throttle opening. And the piston valve 15 may also act to slightly retard the action of the diaphragm when moving to its upper limit so as to retard the closing action of the metering valve.

It may also be desirable to provide a dash pot action between sleeve 21 and valve member 23, by making the sliding fit between these members sufficiently close to retard the flow of air to or from the chamber 40, whereby the action of sleeve 21 may be slightly retarded. As for example, should the engine be operating under full load so that there is very little vacuum in the manifold, the diaphragm and metering valve will be actuated to their lowermost position, and should the throttle valve be suddenly closed, the diaphragm may immediately jump to its uppermost position while sleeve 21 may rise at a rate determined by the leakage of air into the chamber 40, thus slightly retarding the action of the metering valve. Likewise, should the throttle be swung open from its closed position, the diaphragm may not jump to its lowermost position, but may be governed in its movement by the rate of air leakage out of chamber 40. The rate of air leakage in or out of chamber 40, may be relatively fast or slow, as determined by the working fit between the sleeve and valve member 23.

From the above description it may be appreciated that I have invented an automatic metering valve operative for metering auxiliary air into the intake manifold, responsive to the degree of vacuum therein, and which device will function to maintain a relatively rich power air-fuel ratio of substantially 12½, when the engine is operating under conditions of idling or heavy power output, but when operating at mean conditions, will automatically function to meter auxiliary air into the intake manifold to increase the air-fuel ratio to substantially the most efficient air-fuel ratio of 16.

Having fully described the invention, it is to be understood that it is not to be limited to the details shown and described herein, but the invention is of the full scope of the appended claims.

I claim:

1. An auxiliary air meter for the intake manifold of an internal combustion engine including a housing having a passage in communication with the engine manifold, a metering valve means operatively mounted in the housing passage and arranged to open said passage while in its mean positions, and to close said passage while at the opposite extreme positions thereof, a diaphragm means forming a unit separate from but in operative engagement with the valve means, said diaphragm means being in communication with the engine intake manifold between the throttle valve and engine and responsive to vacuum changes in said manifold for actuating said metering valve means, and valve means operatively associated with the diaphragm for controlling the vacuum communicating passage from the engine manifold to the diaphragm.

2. An auxiliary air meter for the intake manifold of an internal combustion engine including a housing having a passage in communication with the engine manifold, a metering valve means operatively associated with the housing passage and arranged to open said passage while in its mean positions, and to close said passage while at the opposite extreme positions thereof, a diaphragm means forming a unit separate from but in operative engagement with the valve means, said diaphragm means being in communication with the engine intake manifold between the throttle valve and engine and responsive to changes in degree of vacuum for actuating said metering valve means from one extreme position to the other, means for dampening the action of said diaphragm, and valve means operatively associated with the diaphragm for controlling the vacuum communicating passage from the engine manifold to the diaphragm.

3. An auxiliary air meter for the intake manifold of an internal combustion engine including a housing having a passage in communication with the engine manifold, a metering valve means operatively associated with the housing passage and arranged to open said passage while in its mean positions, and to close said passage at the opposite extreme positions thereof, said metering valve including means for dampening the action thereof, a diaphragm means forming a unit separate from but in operative engagement with the valve means, said diaphragm means being in communication with the engine intake manifold between the throttle valve and engine and responsive to changes in degree of vacuum for actuating said metering valve means from one extreme position to the other, and valve means operatively associated with the diaphragm for controlling the vacuum communicating passage from the engine manifold to the diaphragm.

4. An auxiliary air meter for the intake manifold of an internal combustion engine including a housing having a passage in communication with the engine manifold, a metering valve means operatively associated with the housing passage and arranged to open said passage while in its mean positions and to close said passage at the opposite extreme positions thereof, said metering valve including means for dampening the action thereof, a diaphragm means in communication with the engine intake manifold between the throttle valve and engine, and responsive to changes in degree of vacuum for actuating said metering valve means from one extreme position to the other, and means for dampening the action of said diaphragm.

5. An auxiliary air meter for the intake manifold of an internal combustion engine including a housing having a passage in communication with the engine manifold, a ported sleeve slidably mounted in said housing passage, a key means for locking said sleeve against rotation, a ported valve member operatively associated with said sleeve, means for adjusting the longitudinal position of the valve member with relation to said sleeve, means for angularly adjusting the valve means with relation to said sleeve, and a diaphragm means in communication with the engine intake manifold between the throttle valve and engine, and responsive to changes in degree of vacuum for actuating said ported sleeve.

6. An auxiliary air meter for the intake manifold of an internal combustion engine including a housing having a passage in communication with the engine manifold, a ported sleeve means slidably mounted in said housing passage, a ported valve member operatively associated with said sleeve, said sleeve and valve member ports arranged to register so as to open said housing passage at the mean position of said sleeve and to close said passage at the extreme positions thereof, and a diaphragm means in communication with the engine intake manifold between the throttle valve and engine, and responsive to changes in degree of vacuum for actuating said sleeve from one extreme position to the other.

7. An auxiliary air meter for the intake manifold of an internal combustion engine including a housing having a passage in communication with the engine maifold, a ported sleeve means slidably mounted in said housing passage, a ported valve member operatively associated with said sleeve, said sleeve and valve member ports arranged to register so as to open said housing passage at the mean position of said sleeve, and to move out of register at the extreme positions thereof, a diaphragm means in communication with the engine intake manifold between the throttle valve and engine, and responsive to changes in degree of vacuum for actuating said sleeve from one extreme position to the other, and a spring means for yieldingly urging said sleeve into operative engagement with said diaphragm.

8. An auxiliary air meter for the intake manifold of an internal combustion engine including a housing having a passage in communication with the engine manifold, a ported sleeve member slidably mounted in said housing passage, a ported valve member operatively associated with said sleeve, said sleeve and valve member ports arranged to register so as to open said housing passage at the mean position of said sleeve and to move out of register at the extreme positions thereof, means for angularly adjusting one of said ported members with relation to the other for regulating the amount which each port will register with the other, and a diaphragm means in communication with the engine intake manifold between the throttle valve and engine and responsive to changes in degree of vacuum for actuating said sleeve from one extreme position to the other.

9. An auxiliary air meter for the intake manifold of an internal combustion engine including a housing having a passage in communication with the engine manifold, a ported sleeve slidably mounted in said housing passage, a ported valve member operatively associated with said sleeve, said sleeve and valve member ports arranged to register so as to open said housing passage at the mean position of said sleeve, and to move out of register at the extreme positions thereof, a diaphragm means in communication with the engine intake manifold between the throttle valve and engine, and responsive to changes in degree of vacuum for actuating said sleeve from one extreme position to the other, and a valve means operatively associated with the diaphragm means for partially restricting the vacuum communication when a relatively high degree of vacuum has built up in said manifold for dampening the action of said diaphragm.

10. An auxiliary air meter for the intake manifold of an internal combustion engine including a housing having a passage in communication with the engine manifold, a ported sleeve slidably mounted in said housing passage, a ported valve member slidably mounted in said sleeve, a chamber formed between said sleeve and member and arranged to act as a dampening means for retarding the action of said sleeve, a spring means mounted in said chamber for yieldingly urging said sleeve and member apart, said sleeve and valve member ports arranged to register so as to open said housing passage at the mean position of said sleeve and to move out of register at the extreme positions thereof, a diaphragm means forming a unit separate from but in operative engagement with the valve means, said diaphragm means being in communication with the engine intake manifold between the throttle valve and engine, and responsive to changes in degree of vacuum for actuating said sleeve from one extreme position to the other, and valve means operatively associated with the diaphragm for controlling the vacuum communicating passage from the engine manifold to the diaphragm.

11. In a system for metering auxiliary air into the intake manifold of an internal combustion engine including a valve means for controlling the admission of auxiliary air into the manifold, vacuum operated means forming a unit separate from but in operative engagement with the valve means, said vacuum operated means arranged to actuate the valve means to closed position when the vacuum in the manifold is at a relatively high degree, to actuate the valve means to open position for mean degrees of vacuum, to close the valve means when the degree of vacuum in the manifold falls below a predetermined value, and valve means operatively associated with the diaphragm for controlling the vacuum communicating passage from the engine manifold to the diaphragm.

12. In a system for metering auxiliary air into the intake manifold of an internal combustion engine including a valve means for controlling the admission of auxiliary air into the manifold, a spring weighted vacuum operated means forming a unit separate from but in operative engagement with the valve means, said vacuum operated means arranged to actuate the valve means to closed position when the engine is idling, to actuate the valve means to open position when the engine is cruising, and to actuate the valve means to closed position when the engine is operating under heavy load conditions, and valve means operatively associated with the diaphragm for controlling the vacuum communicating passage from the engine manifold to the diaphragm.

13. In a system for metering auxiliary air into the intake manifold of an internal combustion engine including a valve means communicating with the manifold at one point for controlling the admission of auxiliary air therein, a vacuum operated means forming a unit separate from but in operative engagement with the valve means, said vacuum operated means in communication with the engine manifold at a second point spaced from said first point and arranged to retain the valve means to close when the vacuum in the manifold is at a relatively high degree, to actuate the valve means to open position for the mean degrees of vacuum and to close the valve means when the degree of vacuum in the manifold falls below a predetermined value, and valve means operatively associated with the diaphragm for controlling the vacuum communicating passage from the engine manifold to the diaphragm.

14. In a system for metering auxiliary air into the intake manifold of an internal combustion engine including a valve means communicating with the manifold at one point for controlling the admission of auxiliary air therein a vacuum operated means forming a unit separate from but in operative engagement with the valve means, said vacuum operated means in communication with the engine manifold at a second point spaced from said first point and arranged to retain the valve means to close when the vacuum in the manifold is at a relatively high degree, to actuate the valve means to open position for the mean degrees of vacuum and to close the valve means when the degree of vacuum in the manifold falls below a predetermined value, and means for dampening the action of said vacuum operated means, and valve means operatively associated with the diaphragm for controlling the vacuum communicating passage from the engine manifold to the diaphragm.

15. An auxiliary air meter for the intake manifold of an internal combustion engine including a housing having a passage in communication with the engine manifold, a metering valve means operatively mounted in the housing passage and arranged to open said passage while in its mean positions, and to close said passage while at the opposite extreme positions thereof, a diaphragm means in communication with the engine intake manifold between the throttle valve and engine and responsive to vacuum changes in said manifold for actuating said metering valve means, and valve means operatively associated with the diaphragm for controlling the vacuum communicating passage from the engine manifold to the diaphragm.

FRANK W. THOMAS.